United States Patent [19]

Yasuno

[11] Patent Number: 5,428,532
[45] Date of Patent: Jun. 27, 1995

[54] VEHICLE DYNAMIC CHARACTERISTIC CONTROL APPARATUS

[75] Inventor: Yoshiki Yasuno, Kanagawa, Japan

[73] Assignee: Nissan Motor Co., Ltd., Yokohama, Japan

[21] Appl. No.: 997,750

[22] Filed: Dec. 30, 1992

[30] Foreign Application Priority Data

Jan. 10, 1992 [JP] Japan .................................. 4-002892

[51] Int. Cl.⁶ .......................... B60L 7/00; B60K 41/00
[52] U.S. Cl. ..................... 364/424.05; 364/424.01; 364/426.01; 303/92; 303/100; 303/91; 280/142; 280/661; 180/140; 180/141; 180/197
[58] Field of Search ............... 364/424.05, 426.01, 364/426.03, 424.01, 424.03; 303/100, 92, 109, 106, 103, 91; 280/142, 661, 673, 691; 180/140, 141, 142, 79.1, 197

[56] References Cited

U.S. PATENT DOCUMENTS

| | | | |
|---|---|---|---|
| 4,998,593 | 3/1991 | Karnopp et al. | 180/140 |
| 5,228,757 | 7/1993 | Ito et al. | 364/426.01 |
| 5,229,944 | 7/1993 | Yasuno | 364/426.01 |
| 5,261,503 | 11/1993 | Yasui | 180/142 |
| 5,267,160 | 11/1993 | Ito et al. | 364/424.05 |
| 5,292,149 | 3/1994 | Luger | 280/661 |

FOREIGN PATENT DOCUMENTS 2-283555 11/1990 Japan .

Primary Examiner—Kevin J. Teska
Assistant Examiner—Jacques H. Louis-Jacques
Attorney, Agent, or Firm—Lowe, Price, Leblane & Becker

[57] ABSTRACT

An apparatus controls the steering angle of a pair of front or rear wheels and the braking forces to be applied to left and right wheels of at least one of the wheel pairs. The apparatus includes a control unit for calculating a target value for a dynamic parameter related to a motion of the vehicle based upon sensed vehicle operating conditions. The control unit calculates a target value for the steering angle of the one wheel pair and controls the steering angle to the calculated target value so as to bring the dynamic parameter to its target dynamic parameter value. An absolute value of the target or actual steering angle is calculated for comparison with a predetermined value. The control unit controls the second control unit to provide a difference between the braking forces applied to the left and right wheels of the one wheel pair so as to bring the dynamic parameter to the target dynamic parameter value only when the calculated absolute value exceeds the predetermined value.

11 Claims, 9 Drawing Sheets

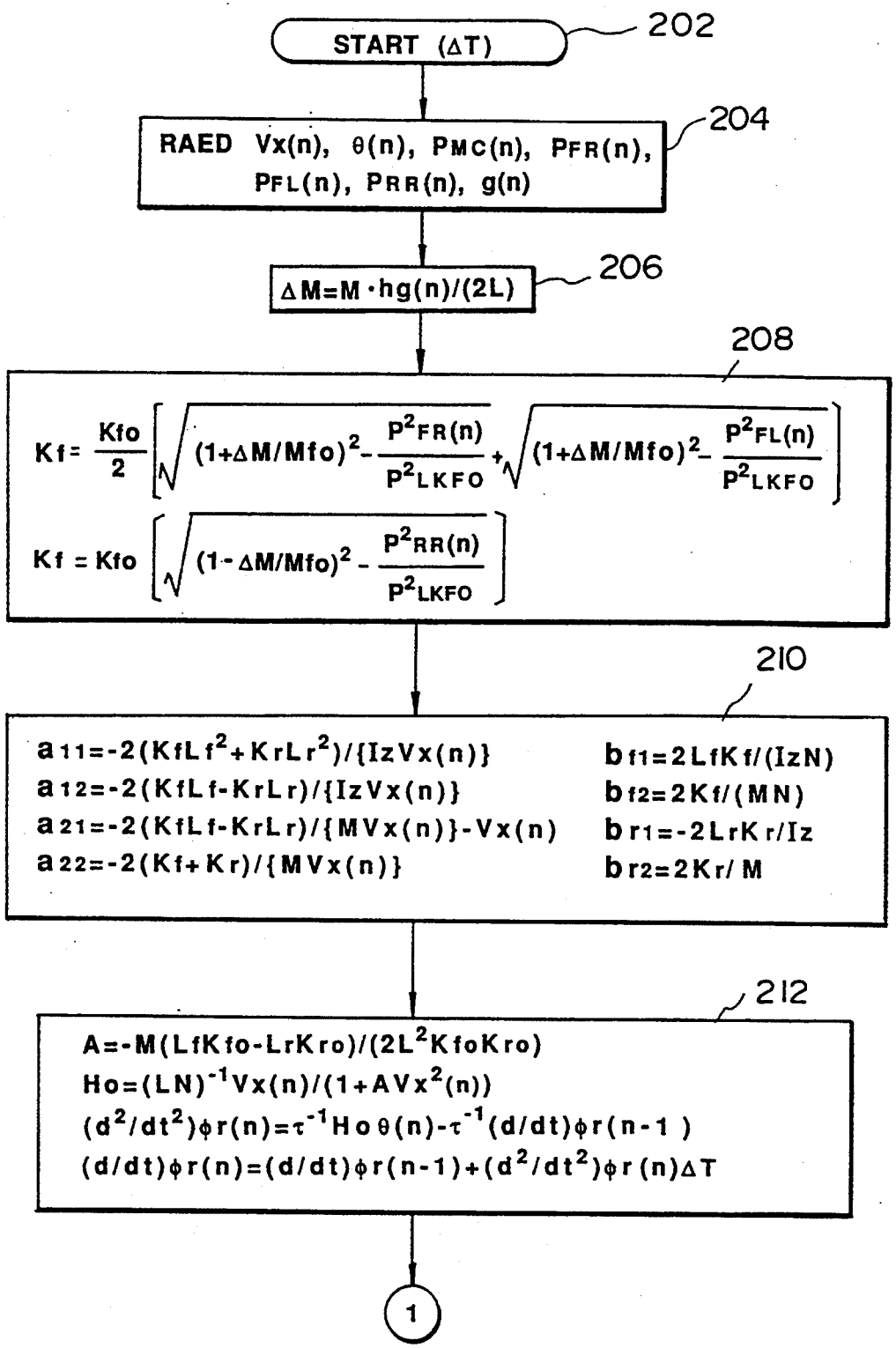

VEHICLE DYNAMIC CHARACTERISTIC CONTROL APPARATUS

BACKGROUND OF THE INVENTION

This invention relates to a vehicle dynamic characteristic control apparatus for use with an automotive vehicle supported on a pair of front wheels and a pair of rear wheels and, more particularly, to a vehicle dynamic characteristic control apparatus for controlling the vehicle dynamic characteristics based upon various vehicle operating conditions by controlling the steering angle of one of the wheel pairs and the difference of the braking forces applied to the left and right wheels of at least one of the wheel pairs.

For example, Japanese Patent Kokai No. 2-283555 discloses a conventional vehicle dynamic characteristic control apparatus for controlling a vehicle dynamic characteristic to a target value based upon various vehicle operating conditions. The conventional vehicle dynamic characteristic control apparatus is arranged to bring the vehicle dynamic characteristic to the target value by controlling the steering angle of one of the wheel pairs when the vehicle yaw rate or vehicle lateral acceleration is less than a predetermined value and by controlling the braking force difference as well as the steering angle when the vehicle yaw rate or vehicle lateral acceleration exceeds the predetermined value.

Although the conventional vehicle dynamic characteristic control apparatus can decrease the number of times the braking force difference control is required so as to reduce the adverse influence on the braking performance, its usefulness is limited. Since the conventional vehicle dynamic characteristic control apparatus is arranged to initiate the braking force difference control by a deviation of the vehicle dynamic characteristic from its target value, it will make an unnecessary braking force difference control in response to a temporary great deviation which can be reduced only by the steering angle control.

SUMMARY OF THE INVENTION

Therefore, a main object of the invention is to provide an improved vehicle dynamic characteristic control apparatus which can minimize the number of times braking control is required to bring a vehicle dynamic parameter to a target value.

It is another object of the invention to provide an improved vehicle dynamic characteristic control apparatus which can minimize the adverse influence on the vehicle braking performance, increase the service life of the parts included in the vehicle braking system, and decrease the energy loss.

There is provided, in accordance with the invention, a vehicle dynamic characteristic control apparatus for use with an automotive vehicle supported on a pair of front wheels and a pair of rear wheels. The apparatus comprises a first control unit for controlling a steering angle of one of the wheel pairs, a second control unit for controlling braking forces to be applied to left and right wheels of at least one of the wheel pairs, sensor means sensitive to operating conditions of the vehicle for providing sensor signals indicative of sensed vehicle operating conditions, and a third control unit coupled to the sensor means for calculating a target value for a dynamic parameter related to a motion of the vehicle based upon the sensed vehicle operating conditions. The third control unit includes first means for calculating a target value for the steering angle of the one wheel pair, second means for controlling the steering angle of the one wheel pair to the target steering angle value so as to bring the dynamic parameter to the target dynamic parameter value, third means for calculating an absolute value of the calculated target steering angle value, fourth means for comparing the calculated absolute value with a predetermined value, and fifth means for controlling the second control unit to provide a difference between the braking forces applied to the left and right wheels of the one wheel pair so as to bring the dynamic parameter to the target dynamic parameter value only when the calculated absolute value exceeds the predetermined value.

In another aspect of the invention, there is provided a vehicle dynamic characteristic control apparatus for use with an automotive vehicle supported on a pair of front wheels and a pair of rear wheels. The apparatus comprises a first control unit for controlling a steering angle of one of the wheel pairs, a second control unit for controlling braking forces to be applied to left and right wheels of at least one of the wheel pairs, sensor means sensitive to operating conditions of the vehicle for providing sensor signals indicative of sensed vehicle operating conditions, and a third control unit coupled to the sensor means for calculating a target value for a dynamic parameter related to a motion of the vehicle based upon the sensed vehicle operating conditions. The third control unit includes first means for sensing an actual value for the steering angle of the one wheel pair, second means for controlling the steering angle of the one wheel pair to the target steering angle value so as to bring the dynamic parameter to the target dynamic parameter value, third means for calculating an absolute value of the sensed actual steering angle value, fourth means for comparing the calculated absolute value with a predetermined value, and fifth means for controlling the second control unit to provide a difference between the braking forces applied to the left and right wheels of the one wheel pair so as to bring the dynamic parameter to the target dynamic parameter value only when the calculated absolute value exceeds the predetermined value.

BRIEF DESCRIPTION OF THE DRAWINGS

The invention will be described in greater detail by reference to the following description taken in connection with the accompanying drawings, in which:

FIGS. 5A and 5B are flow diagrams showing the programming of the digital computer as used to calculate target values for the fluid pressures supplied to the left and right front wheel cylinders;

DETAILED DESCRIPTION OF THE INVENTION

Figure 1:
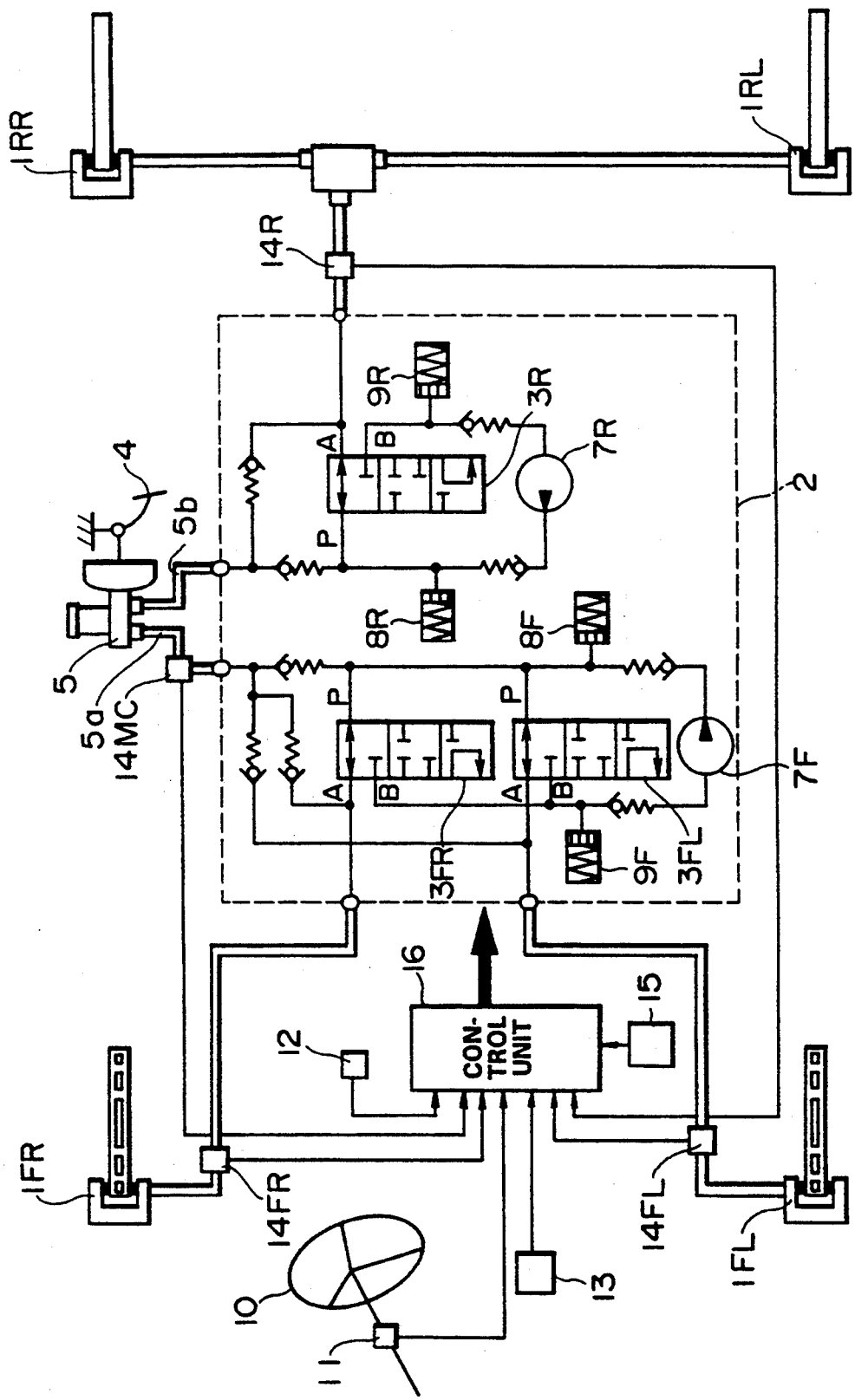
FIG. 1 is a schematic diagram showing a braking force control unit used in one embodiment of a vehicle dynamic characteristic control apparatus embodying the invention.

With reference to the drawings, and in particular to FIG. 1, there is shown a schematic diagram of a braking force control unit used in a vehicle dynamic characteristic control apparatus embodying the invention. The invention will be described in connection with an automotive vehicle supported on a pair of front road wheels associated with respective front wheel cylinders 1FL and 1FR situated in front wheel brakes for application of brakes to the respective front road wheels and a pair of rear road wheels associated with respective rear wheel cylinders 1RL and 1RR situated in rear wheel brakes for application of brakes to the respective rear road wheels. An actuator, generally designated by the numeral 2, operates the wheel cylinders 1FL, 1FR, 1RF and 1RR for applying controlled braking forces to the respective road wheels. The numeral 4 designates a brake pedal which actuates the pistons in a tandem master cylinder 5 and forces fluid through first and second conduits 5a and 5b to the actuator 2.

The actuator 2 includes solenoid valves 3FL, 3FR and 3R. The solenoid valve 3FL has three ports A, B and P. The port P is connected to the first conduit 5a, the port A is connected to the wheel cylinder 1FL, and the port B is connected to the first conduit 5a through a motor driven pump 7F. A reservoir 9F is connected to the conduit connected between the port B and the pump 7F. An accumulator 8F is connected to the conduit connected between the pump 7F and the port P for charging up the fluid flow through the conduit. The solenoid valve 3FL operates on a command current signal fed thereto from a control unit 16 to occupy one of three positions. The first position, illustrated in FIG. 1, is occupied to provide communication between the ports P and A so as to increase the fluid pressure introduced into the wheel cylinder 1FL. The second position is encountered to interrupt the communication between the ports P and A so as to retain the fluid pressure in the wheel cylinder 1FL at a constant value. The third position is encountered to provide communication between the ports A and B so as to reduce the fluid pressure in the wheel cylinder 1FL.

Similarly, the solenoid valve 3FR has three ports A, B and P. The port P is connected to the first conduit 5a and also to the port P of the solenoid valve 3FL, the port A is connected to the wheel cylinder 1FR, and the port B is connected to the port B of the solenoid valve 3FL. The solenoid valve 3FR operates on a command current signal fed thereto from the control unit 16 to occupy one of three positions. The first position, illustrated in FIG. 1, is occupied to provide communication between the ports P and A so as to increase the fluid pressure introduced into the wheel cylinder 1FR. The second position is encountered to interrupt the communication between the ports P and A so as to retain the fluid pressure in the wheel cylinder 1FR at a constant value. The third-position is encountered to provide communication between the ports A and B so as to reduce the fluid pressure in the wheel cylinder 1FR.

The solenoid valve 3R has three ports A, B and P. The port P is connected to the second conduit 5b, the port A is connected to the wheel cylinders 1RL and 1RR, and the port B is connected to the second conduit 5b through a motor driven pump 7R. A reservoir 9R is connected to the conduit connected between the port B and the pump 7R. An accumulator 8R is connected to the conduit connected between the pump 7R and the port P for charging up the fluid flow through the conduit. The solenoid valve 3R operates on a command current signal fed thereto from the control unit 16 to occupy one of three positions. The first position, illustrated in FIG. 1, is occupied to provide communication between the ports P and A so as to increase the fluid pressure introduced to the wheel cylinders 1RL and 1RR. The second position is encountered to interrupt the communication between the ports P and A so as to retain the fluid pressure in the wheel cylinders 1RL and 1RR at a constant value. The third position is encountered to provide communication between the ports A and B so as to reduce the fluid pressure in the wheel cylinders 1RL and 1RR.

Each of the command current signals to the respective solenoid valves 3FL, 3FR and 3R has three levels repetitively determined from calculations performed by the control unit 16. These calculations are made based upon various conditions of the automotive vehicle that are sensed during its operation. These sensed conditions include steering angle $\theta$, vehicle speed Vx, brake pedal position, master cylinder pressure $P_{MC}$, fluid pressures $P_{FL}$ and $P_{FR}$ supplied to the respective wheel cylinders 1FL and 1FR, fluid pressure PR supplied to the wheel cylinders 1RL and 1RR, and vehicle longitudinal acceleration g. Thus, a steering angle sensor 11, a vehicle speed sensor 12, a brake switch 13, fluid pressure sensors 14MC, 14FL, 14FR and 14R, and a vehicle longitudinal G sensor 15 are connected to the control unit 16.

The steering angle sensor 11 is provided to sense the degree $\theta$ of rotation of a steering wheel 10 with respect to its neutral position and it produces an electric signal indicative of the sensed steering angle $\theta$. The steering angle indication signal has a sign indicating the direction in which the steering wheel turns. In the illustrated case, the steering angle indication signal has a positive sign when the steering wheel 10 turns to the left with respect to its neutral position and a negative sign with the steering wheel 10 turns to the right with respect to its neutral position. The vehicle speed sensor 12 is provided to sense the vehicle longitudinal speed Vx and it produces an electric signal indicative of the sensed vehicle speed Vx. The brake switch 13 is associated with the brake pedal 4 to close to supply current from the engine battery to the control unit 16 in response to the application of foot braking to the vehicle (when the brake pedal 4 is depressed). The master cylinder pressure sensor 14MC is shown as positioned in the first conduit 5a to sense the fluid pressure $P_{MC}$ and it produces an electric signal indicative of the sensed pressure $P_{MC}$ of the fluid discharged from the master cylinder 5. The fluid pressure sensors 14FL and 14FR are positioned to sense the fluid pressures $P_{FL}$ and $P_{FR}$ introduced into the respective wheel cylinders 1FL and 1FR. The fluid pressure sensors 14FL and 14FR produce electric signals indicative of the sensed fluid pressures $P_{FL}$ and $P_{FR}$ to the control unit 16. The fluid pressure sensor 14R is positioned to sense the fluid pressure PF introduced into the wheel cylinders 1RL and 1RR. The fluid pressure sensors 14R produces an electric signal indicative of the sensed fluid pressure $P_R$ to the control unit 16. The vehicle longitudinal G sensor 15 produces an electric signal indicative of the sensed acceleration g of the vehicle in the longitudinal direction to the control unit 16.

The control unit 16 may employ a digital computer including an input interface, an output interface, a central processing unit, and a memory. The control processing unit communicates with the rest of the computer va data bus. The memory contains programs for operating the central processing unit and further contains appropriate data (vehicle model) used in calculating appropriate command signal values. The vehicle model may be derived from equations of motions of a vehicle similar to the vehicle to be controlled. The calculated command signal valves are transferred by the central processing unit to the output interface which converts them into analog form for application to respective floating type constant current circuits. The constant current circuits set the solenoid valves 3FL, 3FR and 3R and the pumps 7F and 7R according to the calculated values for them to perform so-called three-channel anti-skid control and braking force differential control.

When the solenoid valves 3FL and 3FR are turned off (in the first position), fluid pressure is introduced from the master cylinder 5 into the front wheel cylinders 1FL and 1FR. In this case, both of the fluid pressure $P_{FL}$ and $P_{FR}$ are equal to the master cylinder fluid pressure $P_{MC}$. If the pump 7F is turned on with one of the solenoid valves 3FL and 3FR being turned on, the one solenoid valve 3FL or 3FR will move to its second or third position to reduce the fluid pressure in the corresponding wheel cylinder so as to produce a difference between the fluid pressures in the front wheel cylinders 1FL and 1FR. This difference provides a difference between the braking force applied to the front-left wheel and the braking force applied to the front-right wheel.

Figure 2:
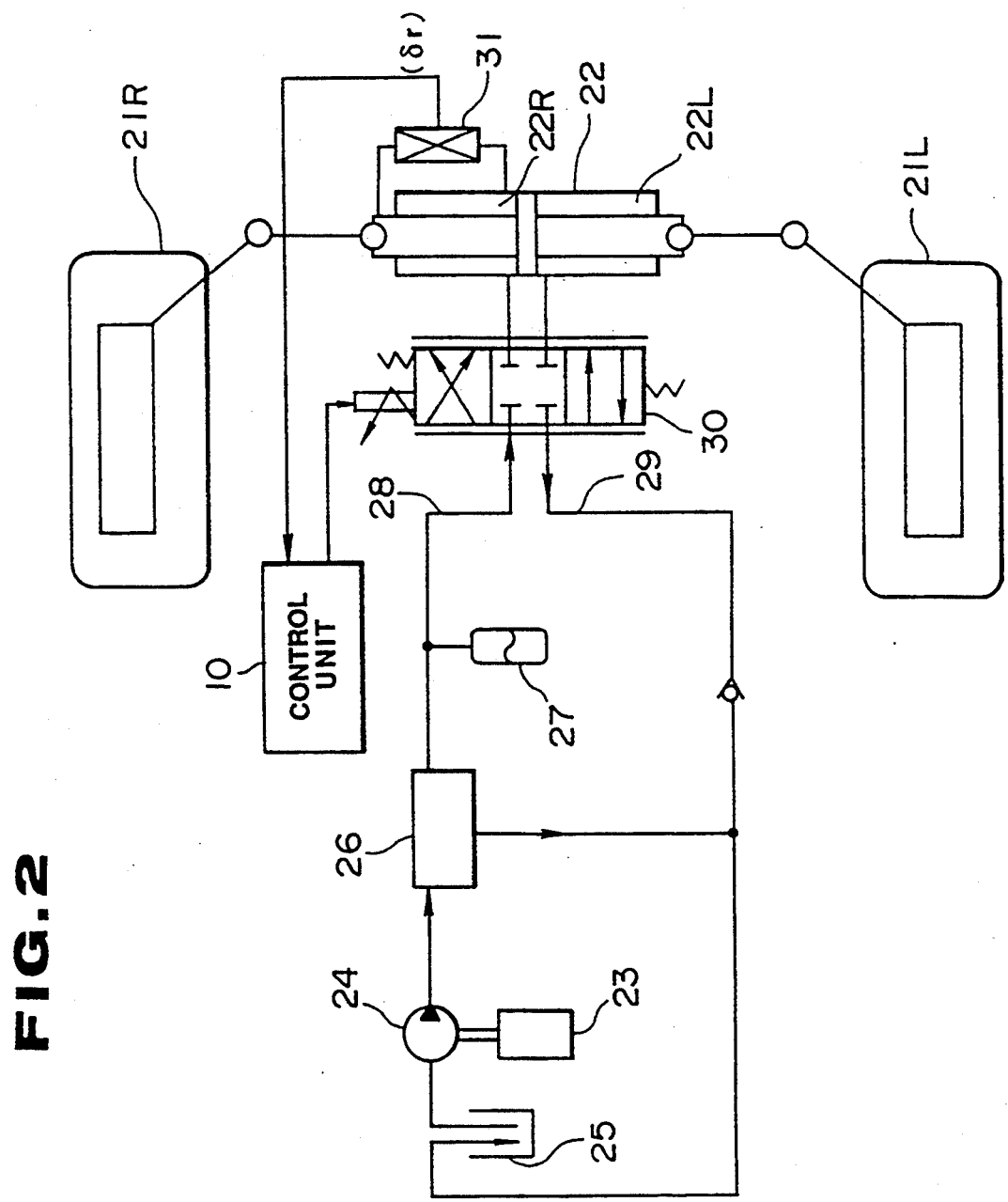
FIG. 2 is a schematic diagram showing a rear-wheel steering control unit used in the vehicle dynamic characteristic control apparatus of the invention.

Referring to FIG. 2, there is shown a rear-wheel steering control unit used in the vehicle dynamic characteristic control apparatus of the invention. The rear wheels 21L and 21R are associated with an auxiliary steering actuator 22 of the spring center type having two pressure chambers 22L and 22R for turning the rear wheels 21L and 21R in response to the fluid pressure acting in the first or second pressure chamber 22L or 22R. The auxiliary steering actuator 22 turns the rear wheels 21L and 21R in a counter-clockwise direction at an angle proportional to the fluid pressure introduced into the first pressure chamber 22L with respect to the vehicle longitudinal axis and it turns the rear wheels 21L and 21R in the clockwise direction at an angle proportional to the fluid pressure introduced into the second pressure chamber 22R with respect to the vehicle longitudinal axis. A pump 24, which is driven by the engine 23, supplies fluid from a reservoir 25 through an unloading valve 26 to cause an accumulator 27 to be charged up the fluid flow through a conduit 28.

The rear-wheel steering control unit includes a control valve 30 operable on a command current signal fed thereto from the control unit 16 to occupy one of three positions. The first position is occupied when the command current signal is a first level and the control valve 30 provides communication of the first chamber 22L of the auxiliary steering actuator 22 with the conduit 28 and communication of the second chamber 22R of the auxiliary steering actuator 22 with a drain conduit 29 which is connected through a check valve to the reservoir 25. As a result, the rear wheels 21L and 21R turn in the counter-clockwise direction. The second position, illustrated in FIG. 2, is occupied when the command current signal is a level of zero and the control valve 30 interrupts the communication of the auxiliary steering actuator 22 with the conduits 28 and 29 to retain the existing rear-wheel steering angle. The third position is encountered when the command current signal is a second level and the control valve 30 provides communication of the first pressure chamber 22L with the drain conduit 29 and communication of the second pressure chamber 22R with the conduit 28. As a result, the rear wheels 21L and 21R turn in the clockwise direction. A rear-wheel steering angle sensor 31 is provided to sense the steering angle $\delta_r$ of the rear wheels 21L and 21R. The rear-wheel steering angle sensor 31 provides a feedback signal to the control unit 16 to ensure that the rear-wheel steering angle $\delta_r$ is correct to maintain a target value calculated by the control unit 16.

Figure 3:
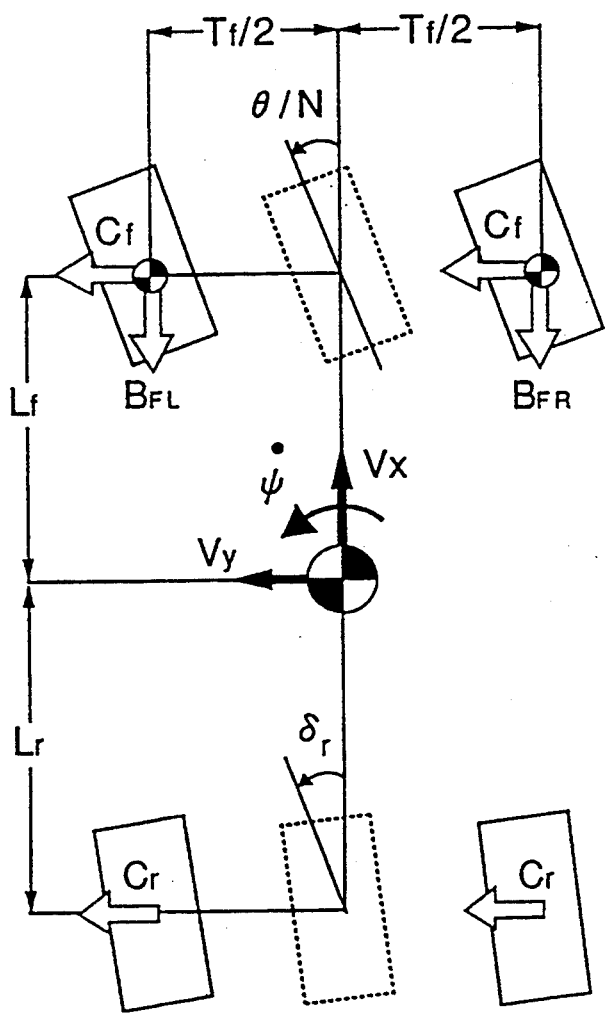
FIG. 3 is a diagram showing a model of an automotive vehicle having two degrees of freedom.

The principles of the invention will be described with reference to FIG. 3. Assuming now that the vehicle has two degrees of freedom, the first degree of freedom providing the yaw motion corresponding to a rotation of the vehicle about its gravity center. The second degree of freedom provides the lateral motion of the vehicle. The following equations of yaw and lateral motions are obtained for an instant (t):

$$I_z \cdot (d^2/dt^2)\phi(t) = C_f \cdot L_f - C_r \cdot L_r + T_f \cdot \frac{B_{FL}(t) - B_{FR}(t)}{2} \quad (1)$$

$$M \cdot (d/dt)V_y(t) = 2(C_f + C_r) - M \cdot V_x(t) \cdot (d/dt)\phi(t) \quad (2)$$

where $I_z$ is the yaw inertia moment of the vehicle, $(d/dt)\Phi(t)$ is the yaw rate, $L_f$ is the distance between the gravity center of the vehicle and the front axle, $L_r$ is the distance between the vehicle gravity center and the rear axle, $T_f$ is the distance between the front wheels, $B_{FR}(t)$ is the braking force applied to the left front wheel, $B_{FR}(t)$ is the braking force applied to the right front wheel, M is the weight of the vehicle, $V_y$ is the speed of lateral motion of the vehicle, $V_y(t)$ is the acceleration of lateral motion of the vehicle, $V_x$ is the speed of longitudinal motion of the vehicle, and $C_f$ and $C_r$ are the cornering forces of the front and rear wheels. The cornering forces $C_f$ and $C_r$ are given as $$C_f = K_f \cdot \left( \frac{\theta(t)}{N} - \frac{V_y + L_f \cdot (d/dt)\phi(t)}{V_x(t)} \right) \quad (3)$$

$$C_r = K_r \cdot \left( \delta_r(t) - \frac{L_r \cdot (d/dt)\phi(t)}{V_x(t)} \right) \quad (4)$$

where $\theta(t)$ is the steering angle, N is the steering gear ratio, $K_f$ is the front-wheel cornering power, $K_r$ is the rear-wheel cornering power, and $\delta_r(t)$ is the rear-wheel steering angle.

Substituting Equations (3) and (4) into Equations (1) and (2) gives $$(d^2/dt^2)\Phi(t) = a_{11} - (d/dt)\Phi(t) + a_{12} - V_y(t) + b_{f1} - \theta(-t) + b_{r1} - \delta_r(t) + b_{p1} - \Delta_{Bf}(t) \quad (5)$$

$$(d/dt)V_y(t) = a_{21} - (d/dt)\Phi(t) + a_{22} - V_y(t) + b_{f2} - \delta_r(t) \quad (6)$$

where $$\Delta B_f(t) = B_{FL}(t) - B_{FR}(t) \tag{7}$$

$$a_{11} = -2(K_f \cdot L_f - L_f + K_r \cdot L_r - L_r)/(I_z - V_x) \tag{8}$$

$$a_{12} = -2(K_f \cdot L_f - K_r \cdot L_r)/(I_z \cdot V_x) \tag{9}$$

$$a_{21} = -2(K_f \cdot L_f - K_r \cdot L_r)/(M \cdot V_x) - V_x \tag{10}$$

$$a_{22} = -2(K_f + K_r)/(M \cdot V_x) \tag{11}$$

$$b_{f1} = 2 - K_f \cdot L_f/(I_z \cdot N) \tag{12}$$

$$b_{f2} = 2 - K_f/(M \cdot N) \tag{13}$$

$$b_{r1} = -2 - K_r \cdot L_r/I_z \tag{14}$$

$$b_{r2} = 2 - k_r/M \tag{15}$$

$$b_{p1} = T_f/(2 \cdot I_z) \tag{16}$$

Figure 4:
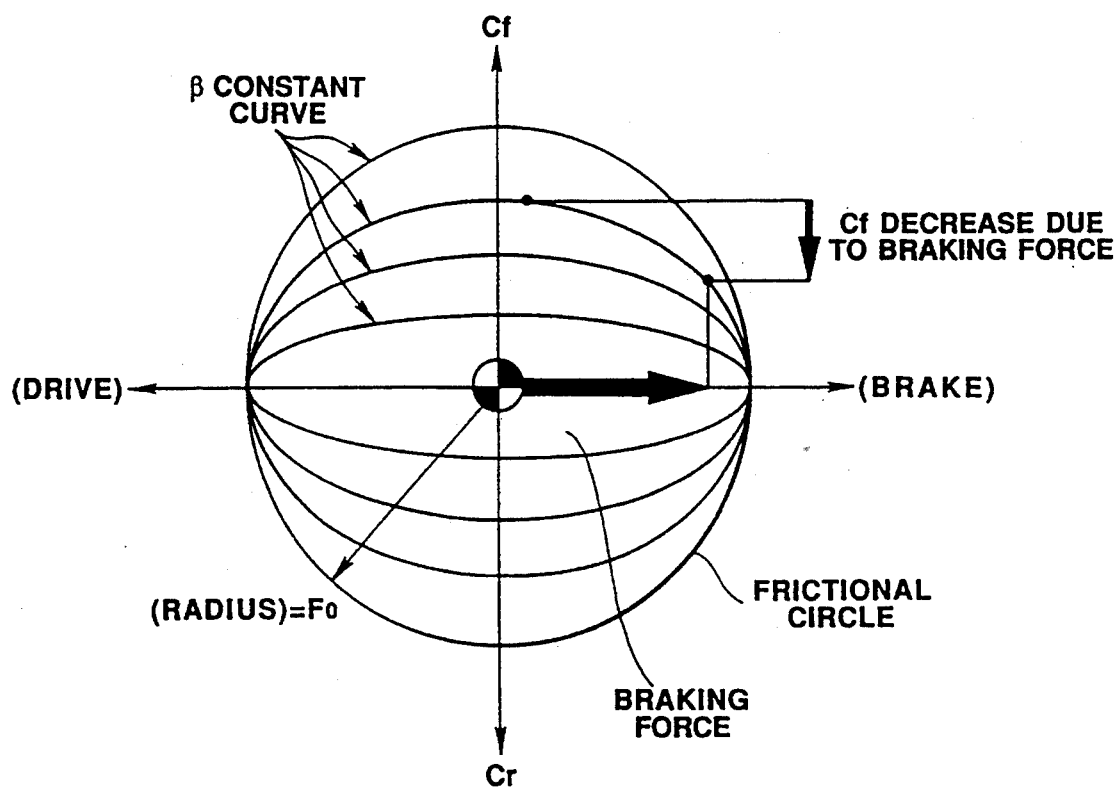
FIG. 4 is a diagram showing the relationship between braking, driving and cornering forces.

FIG. 4 shows a friction circle used to provide the concept of the relationship of the front and rear wheel cornering forces $C_f$ and $C_r$ with the braking and driving forces. The radius of the friction circle corresponds to the maximum possible frictional force Fo produced by the tire. Assuming now that the cornering force $C_f$ of the front wheels is proportional to the lateral slip angle $\beta$, the maximum cornering force $C_{fmax}$ obtained when all of the tire frictional force is used in the lateral direction is defined in relation to the maximum possible frictional force Fo as follows:

$$C_{fmax} = F_0 \cdot K_{f0} \cdot \beta_{max} \tag{17}$$

where $\beta_{max}$ is the lateral slip angle $\beta$ when the cornering force $C_f$ is at the maximum value $C_{fmax}$, and $K_{f0}$ is the cornering power of the front wheels in the absence of vehicle braking. If the moment of inertia of the wheels are neglected, the wheel cylinder pressure $P_{LKFO}$ obtained when all of the tire frictional force is used as the braking force is defined in relation to the maximum possible frictional force fo as follows:

$$F_0 = K_p \cdot P_{LKFO} \tag{18}$$

where $K_p = 2 \cdot \mu_p \cdot A_p \cdot r_p/R$, $\mu_p$ is the coefficient of friction between the brake pad and the disc rotor, $A_p$ is the area of the wheel cylinder, $r_p$ is the effective radius of the disc rotor and R is the radius of the tire.

The friction circle radius F, the wheel cylinder pressure $P_{LKF}$, and the cornering power $K_{f2}$ all of which are produced in the presence of vehicle braking are calculated from the known four values $F_0$, $K_{f0}$, $K_p$ and $P_{LKFO}$. When a braking force is applied to the vehicle, a load shift occurs to the front wheels. The steady load shift amount $\Delta M$ for a wheel is given as:

$$\Delta M = M \cdot h \cdot g/(L \cdot 2) \tag{19}$$

where M is the weight of the vehicle, j is the height of the gravity center of the vehicle, L is the wheel base and g is the deceleration of the vehicle.

Assuming that the road conditions are constant, the friction circle radius F is in direct proportion to the load of the wheel on the ground (referred hereinafter to as wheel load). When the load shift occurs as given by Equation (19), the F is given as:

$$F = F_0 \cdot (1 + \Delta M/M_{f0}) \tag{20}$$

where $M_{f0}$ is the front wheel load for one wheel when the vehicle is at rest and given as:

$$M_{f0} = M \cdot L_r/(L \cdot 2) \tag{21}$$

If the value $\beta_{max}$ is constant regardless of the wheel load, the cornering power will be directly proportional to the wheel load. Thus, the cornering power $K_{f1}$ obtained during a load shift is given as:

$$K_{f1} = K_{f0} \cdot (1 + \Delta M/M_{f0}) \tag{22}$$

Similarly, the value $P_{LKF}$ is given as $$P_{LKF} = P_{LKFo} \cdot (1 + \Delta M/M_{f0}) \tag{23}$$

When a braking force $B_f$ is applied, the cornering force $C_f$ produced by the tire decreases and the value $C_{fmax}$ varies as follows:

$$\begin{aligned} C_{fmax} &= (F^2 - B_f^2)^{\frac{1}{2}} \\ &= K_{f0} \cdot (1 + \Delta M/M_{f0}) \cdot [1 - (B_f/F)^2]^{\frac{1}{2}} \cdot \beta_{max} \end{aligned} \tag{24}$$

Thus, the value $K_{f2}$ is given as:

$$K_{f2} = K_{f0} \cdot (1 + \Delta M/M_{f0}) \cdot [1 - (B_r/F)^2]^{\frac{1}{2}} \tag{25}$$

Assuming that $Av(K_{f2})$ is the average value of the left- and right-wheel cornering powers $K_{f2}$, the braking forces $B_{FL}$ and $B_{FR}$ may be used to calculate the average value as:

$$\begin{aligned} Av(K_{f2}) &= (K_{f0}/2) \cdot (1 + \Delta M/M_{f0}) \cdot [(1 - (B_{FR}/F)^2)^{\frac{1}{2}} \\ &\quad + (1 - (B_{FL}/F)^2)^{\frac{1}{2}}] \end{aligned} \tag{26}$$

Substituting Equations (17) and (19) into Equation (26), the average value $Av(K_{f2})$ is represented as a function of the left- and right-wheel cylinder pressures $P_{FR}$ and $P_{FL}$ as follows:

$$\begin{aligned} Av(K_{f2}) &= K_{f0}/2 \cdot [(1 + \Delta M/M_{f0})^2 - (P_{FR}/P_{LKFO})^2]^{\frac{1}{2}} \\ &\quad + ((1 + \Delta M/M_{f0})^2 - (P_{FL}/P_{LKFo})^2)^{\frac{1}{2}}] \end{aligned} \tag{27}$$

Similarly, the cornering power $K_{r2}$ when the wheel cylinder pressure $P_{RR}$ is applied to the rear wheels is given as:

$$K_{r2} = K_{r0} \cdot [(1 - \Delta M/M_{r0})^2 - (P_{RR}/P_{LKRO})^2]^{\frac{1}{2}} \tag{28}$$

where $M_{r0}$ is the rear wheel load when the vehicle is at rest, $P_{LKRO}$ is the wheel cylinder pressure when the maximum braking force occurs at the rear wheel load $M_{r0}$, and $K_{r0}$ is the cornering power in the absence of vehicle braking.

Using a differential operator S, Equations (5) and (6) may be modified to give the produced yaw rate $(d/dt)\Phi I$ in relation to the steering angle $\theta(t)$.

$$\begin{aligned} (d/dt)\phi 1(t) &= \frac{b_{f1} \cdot S + (a_{12} \cdot b_{f2} - a_{22} \cdot b_{f1})}{S^2 - (a_{11} + a_{22})S + (a_{11} \cdot a_{22} - a_{12} \cdot a_{21})} \theta(t) \\ &= X(S) \cdot \theta(t) \end{aligned} \tag{29}$$

Similarly, the relationship of the produced lateral speed $V_{y1}(t)$ with respect to the steering angle $\theta(t)$ is given as $$V_{y1}(t) = \frac{b_{f2} \cdot S + (a_{21} \cdot b_{f1} - a_{11} \cdot b_{f2})}{S^2 - (a_{11} + a_{22})S + (a_{11} \cdot a_{22} - a_{12} \cdot a_{21})} \theta(t) \quad (30)$$
$$= Y(S) \cdot \theta(t)$$

where X(S) and Y(S) are the transfer functions taken in the form of (an equation of the first degree)/(an equation of the second degree). It is apparent from Equations (29) and (30) that the tendency of the produced yaw rate $(d/dt)\Phi_1(t)$ and the lateral speed $V_{y1}(t)$ to oscillate with respect to the steering angle $\theta(t)$ increases so as to degrade the vehicle steering performance as the vehicle speed $V_x$ increases. It has been proposed to control the rear-wheel steering angle in such a manner that the produced yaw rate agrees well with a target yaw rate $(d/dt)\Phi_r(t)$. Assuming now that the target yaw rate $(d/dt)\Phi_r(t)$ has a first order lag without any over- and under-shoot with respect to the steering angle $\theta(t)$ and its steady value is equal to that for normal vehicles in the absence of vehicle braking, the target yaw rate $(d/dt)\Phi_r(t)$ is given by $$(d/dt)\Phi_r(t) = H_0 \cdot \theta(t)/(1+\tau_1 \cdot S) \quad (31)$$

where $H_0$ is the steady yaw rate gain obtained in the absence of vehicle braking. The steady yaw rate gain is given by $$H_0 = V_x/(1 + A \cdot V_x^2) \cdot L - N) \quad (32)$$

where L is a wheel base, and A is a stability factor given by $$A = \frac{-M(L_f \cdot K_f - L_r \cdot K_r)}{2 \cdot L^2 \cdot K_f \cdot K_r} \quad (33)$$

Description will be made to the manner in which the rear-wheel steering angle is controlled to realize the target yaw rate $(d/dt)\Phi_r(t)$ as expressed in Equation (31). Equation (31) may be modified to obtain Equation (34) which gives the differentiated values $(d^2/dt^2)\Phi_r(t)$ of the target yaw rate.

$$(d^2/dt^2)\Phi_r(t) = H_0 \cdot \theta(t)/\tau_1 - (d/dt)\Phi_r(t)/\tau_1 \quad (34)$$

If the produced yaw rate $(d/dt)\Phi(t)$, which results from the steering angle $\theta(t)$ and the rear-wheel steering angle $\delta_r(t)$, is equal to the target yaw rate $(d/dt)\Phi_r(t)$, the differentiated value $(d^2/dt^2)\Phi(t)$ of the produced yaw rate will be equal to the differentiated value $(d^2/dt^2)\Phi_r(t)$ of the target yaw rate. It is assumed that $(d/dt)\Phi_r(t) = (d/dt)\Phi(t)$ and $(d^2/dt^2)\Phi_r(t) = (d^2/dt^2)\Phi(t)$ and that the lateral speed $V_y(t)$ is $V_{yr}(t)$ when $(d/dt)\Phi_r(t) = (d/dt)\Phi(t)$ and $(d^2/dt^2)\Phi_r(t) = (d^2/dt^2)\Phi(t)$. Substituting these values into Equations (5) and (6) gives $$(d^2/dt^2)\Phi_r(t) = a_{11} \cdot (d/dt)\Phi_r(t) + a_{12} \cdot V_{yr}(t) + b_{f1} \cdot \theta(t) + b_{r1} \cdot \delta_r(t) \quad (35)$$

$$(d/dt)V_{yr}(t) = a_{21} \cdot (d/dt)\Phi_r(t) + a_{22} \cdot V_{yr}(t) + b_{f2} \cdot \theta(t) + b_{r2} \cdot \delta_r(t) \quad (36)$$

From Equations (35) and (36), the target rear-wheel steering angle $\delta_r(t)$ is given as $$\delta_r(t) = \frac{(d^2/dt^2)\Phi_r(t) - a_{11} \cdot (d/dt)\Phi_r(t)}{b_{r1}} - \frac{a_{12} \cdot V_{yr}(t) + b_{f1} \cdot \theta(t)}{b_{r1}} \quad (37)$$

It is, therefor, possible to bring the produced yaw rate into coincidence with the target yaw rate without the tendency of the vehicle lateral speed to oscillate regardless of the longitudinal vehicle speed $V_x$ by controlling the rear-wheel steering angle to a target value calculated from Equation (37). In practice, however, the rear-wheel steering angle has an upper limit $\delta_{rmax}$ and the produced yaw rate cannot be brought into coincidence with the target yaw rate only by the rear-wheel steering control if the absolute value $|\delta_r(t)|$ exceeds the upper limit $\delta_{rmax}$ after the calculation made from Equation (37). In this case, the difference $\Delta B_f(t)$ between the braking forces applied to the left and right wheels is controlled with the rear-wheel steering angle fixed at the upper limit $\delta_{rmax}$. For this reason, Equations (35) and (36) may be modified to take the braking force difference $\Delta B_f(t)$ into account as follows:

When $\delta_r(t) > \delta_{rmax}$, $$(d^2/dt^2)\Phi_r(t) = a_{11} \cdot (d/dt)\Phi_r(t) + a_{12} \cdot V_{yr}(t) + b_{f1} \cdot \theta(t) + b_{r1} \cdot \delta_{rmax}(t) + b_{p1} \cdot \Delta B_f(t) \quad (38)$$

$$(d/dt)V_{yr}(t) = a_{21} \cdot (d/dt)\Phi_r(t) + a_{22} \cdot V_{yr}(t) + b_{f2} \cdot \theta(t) + b_{r2} \cdot \delta_{rmax} \quad (39)$$

When $\delta_r(t) > -\delta_{rmax}$, $$(d^2/dt^2)\Phi_r(t) = a_{11} \cdot (d/dt)\Phi_r(t) + a_{12} \cdot V_{yr}(t) + b_{f1} \cdot \theta(t) - b_{r1} \cdot \delta_{rmax}(t) + b_{p1} \cdot \Delta B_f(t) \quad (40)$$

$$(d/dt)V_{yr}(t) = a_{21} \cdot (d/dt)\Phi_r(t) + a_{22} \cdot V_{yr}(t) + b_{f2} \cdot \theta(t) - b_{r2} \cdot \delta_{rmax} \quad (41)$$

The braking force difference $\Delta B_f$ required to bring the produced yaw rate into agreement with the target yaw rate is calculated from the following Equations (42) and (43) derived from Equations (38) to (41): When $\delta_r(t) > \delta_{rmax}$, $$\Delta B_f(t) = \frac{(d^2/dt^2)\Phi_r(t) - a_{11} \cdot (d/dt)\Phi_r(t) - a_{12} \cdot V_{yr}(t)}{b_{p1}} + \frac{b_{f1} \cdot \theta(t) - b_{r1} \cdot \delta_{rmax}}{b_{p1}} \quad (42)$$

When $\delta_r(t) < -\delta_{rmax}$, $$\Delta B_f(t) = \frac{(d^2/dt^2)\Phi_r(t) - a_{11} \cdot (d/dt)\Phi_r(t) + a_{12} \cdot V_{yr}(t)}{b_{p1}} - \frac{b_{f1} \cdot \theta(t) - b_{r1} \cdot \delta_{rmax}}{b_{p1}} \quad (43)$$

The braking force control unit of FIG. 1 produces the braking force difference $\Delta B_f$ calculated from Equation (42) or (43) by controlling the difference between the pressures introduced into the left- and right-front wheels to a target value $\Delta P(t)$. The target value $\Delta P(t)$ is derived from Equation (18) as follows:

$$\Delta P(t) = \Delta B_f(t)/K_p \quad (44)$$

The target wheel cylinder pressures $P_{FL}(t)$ and $P_{FR}(t)$ are calculated based upon the target pressure difference $\Delta P(t)$ calculated from Equation (35) and the master cylinder pressure $P_{MC}(t)$. These calculations are made as follows:

$$P_{FL}(t) = P_{MC}(t) \quad (\Delta P(t) \geq 0) \quad (45)$$
$$= P_{MC}(t) + \Delta P(t) \quad (\Delta P(t) < 0 \text{ and } P_{MC}(t) > -\Delta P(t))$$
$$= 0 \quad (\Delta P(t) < 0 \text{ and } P_{MC}(t) \leq -\Delta P(t))$$

$$P_{FR}(t) = P_{MC}(t) \quad (\Delta P(t) < 0) \quad (46)$$
$$= P_{MC}(t) - \Delta P(t) \quad (\Delta P(t) \geq 0 \text{ and } P_{MC}(t) > -\Delta P(t))$$
$$= 0 \quad (\Delta P(t) \geq 0 \text{ and } P_{MC}(t) \leq -\Delta P(t))$$

Figure 5B:
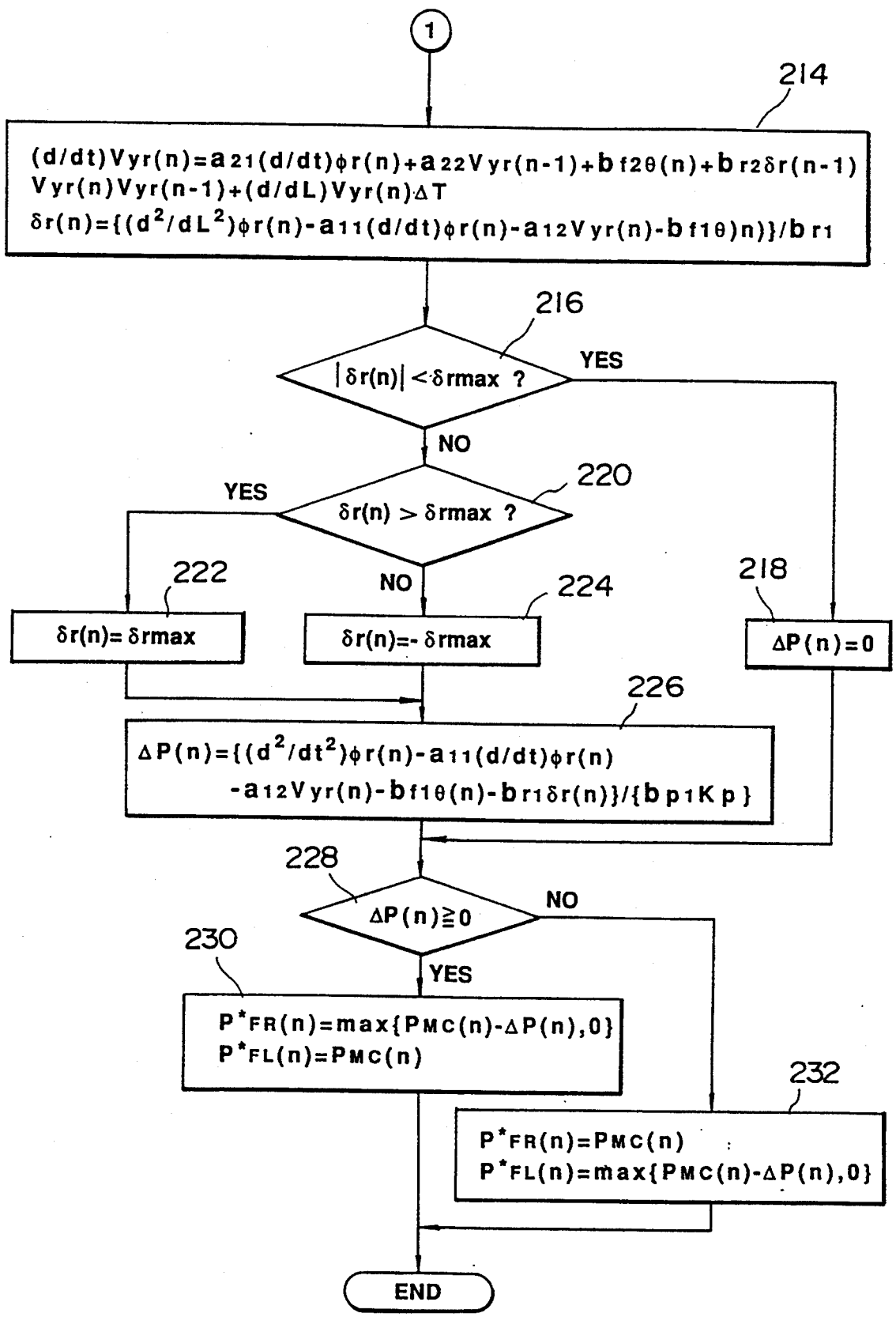

FIGS. 5A and 5B are flow diagrams illustrating the programming of the digital computer as it is used to calculate target values $P*_{FL}(n)$ and $P*_{FR}(n)$ for the fluid pressures to be supplied to the wheel cylinders 1FL and 1FR. The computer program is entered at the point 202 at uniform intervals of time $\Delta T$. At the point 204 in the program, the vehicle speed $V_x(n)$, the steering angle $\theta(n)$, the master cylinder pressure $P_{MC}(n)$, the wheel cylinder pressures $P_{FL}(n)$, $P_{FR}(n)$ and $P_{RR}(n)$, and the vehicle longitudinal acceleration $g(n)$ are read into the computer memory. At the point 206 in the program, the load shift amount $\Delta M$ is calculated from Equation (19). At the point 208 in the program, the front- and rear-wheel cornering powers $K_f$ and $K_r$ are calculated from Equations (27) and (28). Upon completion of these calculations, the program proceeds to the point 210 where the calculated cornering powers $K_f$ and $K_r$ are used to calculate the coefficients $a_{11}$, $a_{12}$, $a_{21}$, $a_{22}$, $b_{f1}$, $b_{f2}$, $b_{r1}$ and $b_{r2}$ from Equations (9) to (15).

At the point 212 in the program, the steady yaw rate gain $H_0$ is calculated, from Equation (32), based upon the vehicle speed $V_x$, the stability factor A calculated from Equation (33), the wheel base L and the steering gear ratio N. The calculated steady yaw rate gain $H_0$ is used to calculate the differentiated value $(d^2/dt^2)\Phi_r(n)$ of the target yaw rate from Equation (34). The present target yaw rate $(d/dt)\Phi_r(n)$ is calculated from Equation (31).

Alternatively, the differentiated value $(d^2/dt^2)\Phi_r(n)$ of the target yaw rate may be calculated as indicated in the block 212 where $(d/dt)\Phi_r(n)$ is the present yaw rate value calculated in the present cycle of execution of this program and $(d/dt)\Phi_r(n-1)$ is the last differentiated yaw rate value calculated in the last cycle of execution of the program. The calculated target yaw rate value $(d/dt)\Phi_r(n)$ is used to update the last target yaw rate value stored in the computer memory.

At the point 214 in the program, the lateral acceleration $(d/dt)V_{yr}(n)$ is calculated, from Equation (36). The calculated lateral acceleration $(d/dt)V_{yr}(n)$ is integrated to calculate the lateral speed $V_{yr}(n)$. The calculated lateral speed value $V_{yr}(n)$ is used to update the last lateral speed value stored in the computer memory. A target rear-wheel steering angle value $\delta_r(n)$, which can bring the yawing motion to its target value only by the rear-wheel steering control, is calculated from Equation (37). The calculated target value $\delta_r(n)$ is outputted to cause the control valve 30 to bring the rear wheels 1RR and 1RL to the angle $\delta_r(n)$.

At the point 216 in the program, a determination is made as to whether or not the absolute value $|\delta_r(n)|$ of the target rear-wheel steering angle $\delta_r(n)$ is less than the maximum possible value $\delta_{rmax}$. If the answer to this question is "yes", then it means that no braking force control is required to bring the yawing motion to its target value and the program proceeds to the point 218 where the wheel cylinder pressure difference $\Delta P(n)$ is set at zero. Following this, the program proceeds to the point 228.

If $|\delta_r(n)| \leq \delta_{rmax}$, then the program proceeds from the point 216 to another determination step at the point 220. This determination is as to whether or not the target rear-wheel steering angle $\delta_r(n)$ is greater than the maximum possible value $\delta_{rmax}$. If the answer to this question is "yes", then it means that the steering wheel is turned to the right and the program proceeds to the point 222 where the target rear-wheel steering angle $\delta_r(n)$ is set at $\delta_{rmax}$ and then to the point 226. If $\delta_r(n) \leq \delta_{rmax}$, then it means that the steering wheel is turned to the left and the program proceeds from the point 220 to the point 224 where the target rear-wheel steering angle $\delta_r(n)$ is set at $-\delta_{rmax}$ and then to the point 226. At the point 226 in the program, the cylinder pressure difference $\Delta P(n)$ is calculated from Equations (42) to (44). Following this, the program proceeds to the point 228.

At the point 228 in the program, a determination is made as to whether or not the calculated target cylinder pressure difference $\Delta P(n)$ is zero or positive. If $\Delta P(n) \geq 0$, then the program proceeds to the point 230 where the master cylinder pressure $P_{MC}(n)$ is set for the target cylinder pressure $P*_{FL}(n)$ to be supplied to the wheel cylinder 1FL and a greater one of "0" and the difference $(P_{MC}(n) - \Delta P(n))$ between the master cylinder pressure $P_{MC}(n)$ and the target cylinder pressure difference $\Delta P(n)$ is set for the target cylinder pressure $P*_{FR}(n)$ to be supplied to the wheel cylinder 1FR. Following this, the program proceeds to the end point 234. If $\Delta P(n) < 0$, then the program proceeds from the point 228 to the point 232 where the master cylinder pressure $P_{MC}(n)$ is set for the target cylinder pressure $P*_{FR}(n)$ to be supplied to the wheel cylinder 1FR and a greater one of "0" and the difference $(P_{MC}(n) - \Delta P(n))$ between the master cylinder pressure $P_{MC}(n)$ and the target pressure difference $\Delta P(n)$ for the target cylinder pressure $P*_{FL}(n)$ to be supplied to the wheel cylinder 1FL. Following this, the program proceeds to the end point 234.

Figure 6:
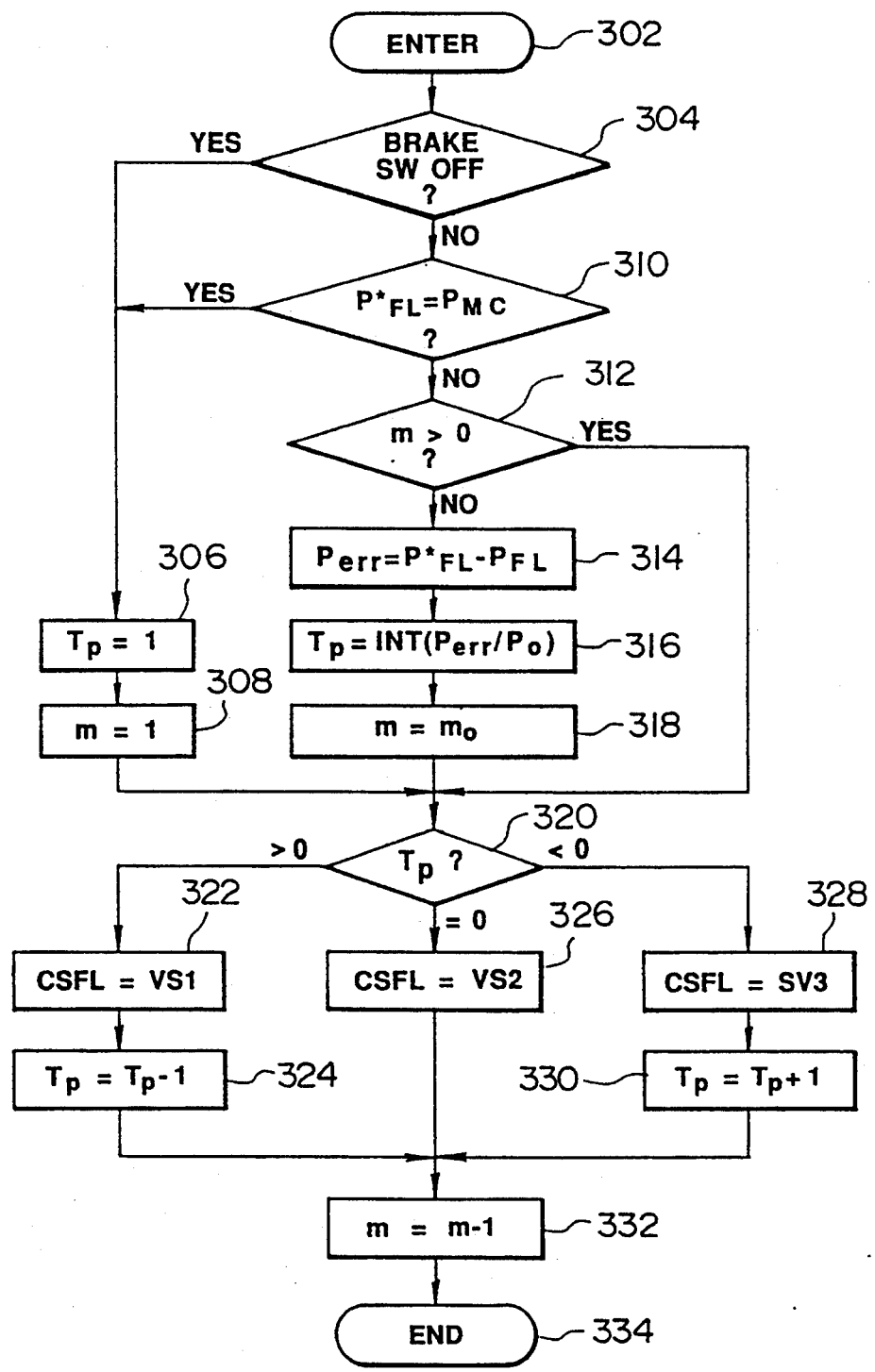
FIG. 6 is a flow diagram showing the programming of the digital computer as used to control the fluid pressure introduced to one of the front wheel cylinders.

FIG. 6 is a flow diagram illustrating the programming of the digital computer as it is used to control the fluid pressure introduced to the wheel cylinder 1FL. The computer program is entered at the point 302 at uniform intervals of time $\Delta$. At the point 304 in the program, a determination is made as to whether or not the brake switch 13 is off. If the answer to this question is "yes", then it means the absence of vehicle braking and the program proceeds to the point 306 where a first variable Tp is set at 1 and then to the point 308 where a second variable m is set at 1. The first variable Tp indicates the time interval during which the control signal to be described later is retained, and the second variable m indicates the time intervals at which an error between the actual cylinder pressure $P_{FL}$ and the target cylinder pressure $P*_{FL}$ is monitored. Upon completion of these settings, the program proceeds to the point 320.

Figure 8:
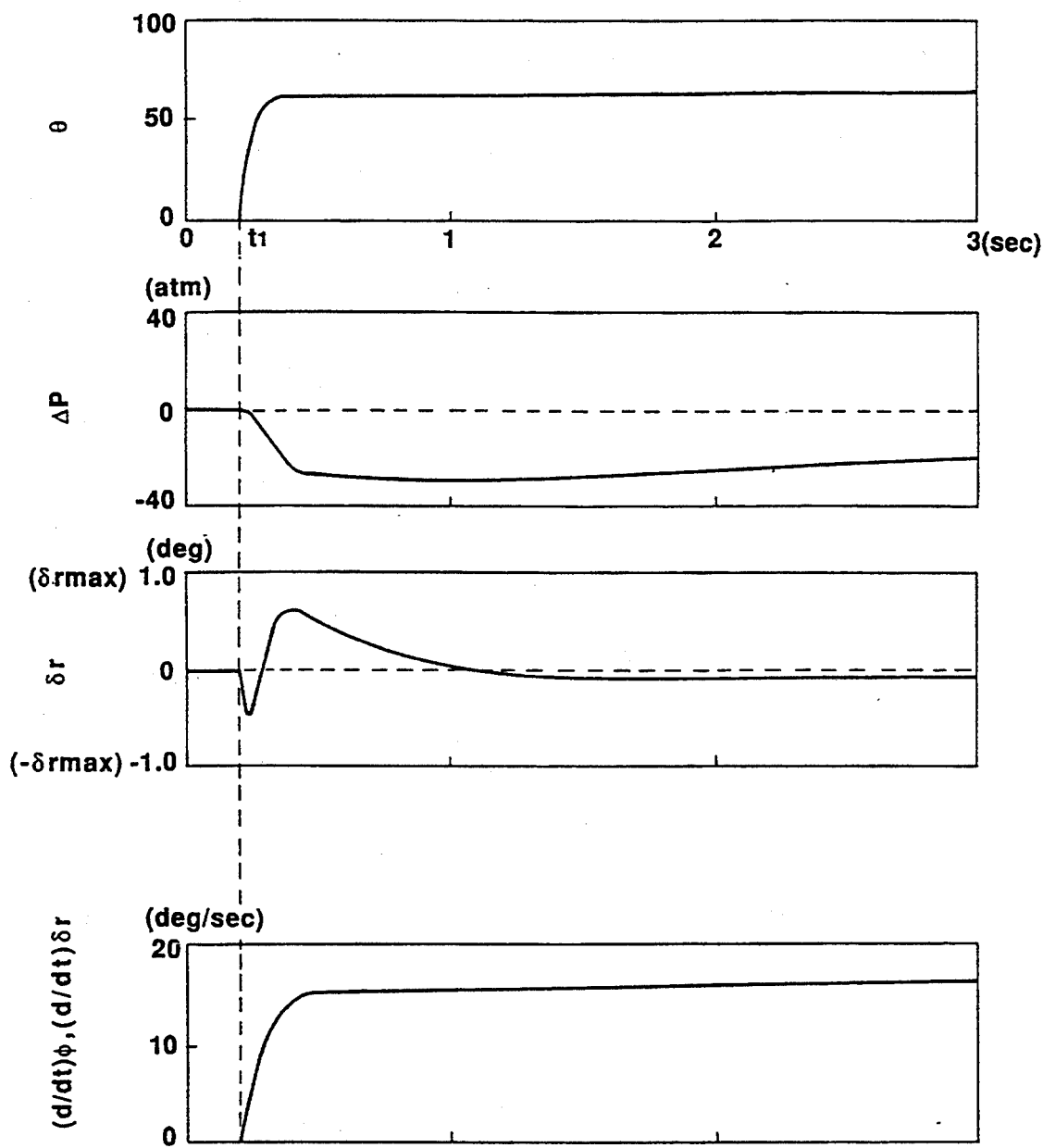
FIG. 8 is a time chart used in explaining the operation of a conventional vehicle dynamic characteristic control apparatus.

If the brake switch 13 is on, then it means that brakes are applied to the vehicle and the program proceeds from the point 304 to another determination step at the point 310. This determination is as to whether or not the target cylinder pressure $P*_{FL}$ calculated in the program of FIG. 8 is equal to the master cylinder pressure $P_{MC}$.

If the answer to this question is "yes", then the program proceeds to the point 306. Otherwise, the program proceeds to the point 312.

At the point 312 in the program, a determination is made as to whether or not the second variable m is greater than zero. If the answer to this question is "yes", then the program proceeds to the point 320. Otherwise, the program proceeds to the point 314 where an error Perr ($=P^*_{FL}-P_{FL}$) between the actual and target values of the pressure applied to the wheel cylinder 1FL and then to the point 316 where the first variable Tp is calculated as $$Tp=INT(Perr/Po)$$

where Po is a reference value indicating an acceptable range and INT means to round to the nearest whole number. At the point 318 in the program, the second variable m is set at a predetermined value mo. Upon completion of this setting, the program proceeds to the point 320.

At the point 320 in the program, a determination is made as to whether the first variable Tp is positive, negative or zero. If the first variable Tp is positive, then the program proceeds to the point 322 where a command is produced to output a control signal CSFL having a first value VS1 causing the constant current circuit to hold the solenoid valve 3FL in the first position increasing the fluid pressure to the wheel cylinder 1FL and then to the point 326 where 1 is subtracted from the first variable Tp. The new value (Tp−1) of the first variable is used to update the last first variable value stored in the computer memory. Following this, the program proceeds to the point 332.

If the first variable Tp is zero, then the program proceeds from the point 320 to the point 326 where a command is produced to output a control signal CSFL having a second value VS2 causing the constant current circuit to move the solenoid valve 3FL to the second position retaining the fluid pressure in the wheel cylinder 1FL. Following this, the program proceeds to the point 332.

If the first variable Tp is negative, then the program proceeds to the point 328 where a command is produced to output a control signal CSFL having a third value VS3 causing the constant current circuit to move the solenoid valve 3FL to the third position decreasing the fluid pressure in the wheel cylinder 1FL and then to the point 330 where 1 is added to the first variable Tp. The new value (Tp+1) is used to update the last value of the first variable stored in the computer memory. Following this, the program proceeds to the point 332.

At the point 332 in the program, 1 is subtracted from the second variable m. The new value (m−1) of the second variable is used to update the last second variable value stored in the computer memory. Following this, the program proceeds to the end point 334.

A similar program is executed separately at uniform intervals of time ΔT for controlling the fluid pressure introduced to the wheel cylinder 1FR.

When the vehicle is traveling in the absence of vehicle braking, the brake switch 13 is off and the first variable Tp is set at 1. As a result, the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. Since the master cylinder pressure discharged from the master cylinder 5 is zero in the absence of vehicle braking, the pressures in the wheel cylinders 1FL and 1FR are zero so that no braking force is produced.

When the brake pedal 4 is depressed, a determination is made as to whether or not the target cylinder pressures $P^*_{FL}$ and $P^*_{FR}$ calculated in the program of FIGS. 5A and 5B are equal to the master cylinder pressure $P_{MC}$ discharged from the master cylinder 5. This determination corresponds to a determination whether the vehicle is moving in a straight line or turning in a circle. If the vehicle is moving in a straight line, the target cylinder pressure $P^*_{FL}$ and $P^*_{FR}$ will be set at a value equal to the master cylinder pressure $P_{MC}$, as described in connection with the program of FIGS. 5A and 5B, and the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the firs t or normal position providing communication between the master cylinder 5 and the wheel cylinder 1FR. As a result, the cylinder pressures $P_{FL}$ and $P_{FR}$ in the respective wheel cylinders 1FL and 1FR increase to a value equal to the master cylinder pressure $P_{MC}$. For this reason, substantially the same braking force is produced in the wheel cylinders 1FL and 1FR.

If the brake pedal 4 is depressed while the vehicle is turning in a circle or if the vehicle turns with the brake pedal 4 being depressed, the target cylinder pressure $P^*_{FL}$ (or $P^*_{FR}$) will be set at a value equal to the master cylinder pressure $P_{MC}$ minus the target pressure difference ΔP, as described in connection with the program of FIGS. 5A and 5B. Since the second variable m is set at zero at the point 332 during the last cycle of execution of the program of FIG. 6, an error Perr between the actual cylinder pressure $P_{FL}$ (or $P_{FR}$) sensed by the pressure sensor 14FL (or 14FR) and the target cylinder pressure $P^*_{FL}$ (or $P^*_{FR}$) is calculated at the point 314 in the program of FIG. 6, and the first variable Tp is set at a value INT(Perr/Fo) at the point 316 in the program of FIG. 6, and the second variable m is set at a redetermined value mo at the point 318 in the program of FIG. 6.

If the actual cylinder pressure $P_{FL}$ (or $P_{FR}$) is less than the target cylinder pressure $P^*_{FL}$ (or $P^*_{FR}$), the first variable Tp will be positive. Consequently, the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. This pressure increasing mode continues until the first variable Tp is reduced to zero at the point 324 in the program of FIG. 6.

When the first variable Tp reaches zero, the control signal CSFL (or CSFR) has a second value VS2 causing the solenoid valve 3FL (or 3FR) to move to the second position interrupting communication between the master cylinder 5 and the wheel cylinder 1FL (or 1FR) so as to retain the fluid pressure $P_{FL}$ (or $P_{FR}$) in the wheel cylinder 1FL (or 1FR) at a constant value. This pressure retaining mode continues until the second variable m is reduced to zero at the point 334 in the program of FIG. 6.

When the second variable m reaches zero, an error Perr between the actual cylinder pressure $P_{FL}$ (or $P_{FR}$) sensed by the pressure sensor 14FL (or 14FR) and the target cylinder pressure $P^*_{FL}$ or $(P^*_{FR})$ is calculated at the point 314 in the program of FIG. 6, and the first variable Tp is set at a value INT(Perr/Po) at the point 316 in the program of FIG. 6, and the second variable m is set at a predetermined value mo at the point 318 in the program of FIG. 6. When the error Perr decreases to a value less than one-half of the reference pressure Po, the first variable Tp is set at zero and thus the pressure retaining mode is selected so that the cylinder pressure $P_{FL}$ (or $P_{FR}$) is retained at the target cylinder pressure $P^*_{FL}$ (or $P^*_{FR}$). When the cylinder pressure $P_{FL}$ (or $P_{FR}$) in the wheel cylinder 1FL (or 1FR) is greater than the target cylinder pressure $P^*_{FL}$ (or $P^*_{FR}$), the error Perr is negative and thus the first variable Tp is negative. As a result, the control signal CSFL (or CSFR) has a third value VS3 causing the solenoid valve 3FL (or 3FR) to move to the third position providing communication of the wheel cylinder 1FL (or 1FR) to the master cylinder 5 through the pump 7F so as to reduce the cylinder pressure $P_{FL}$ (or $P_{FR}$) in the wheel cylinder 1FL (or 1FR). This pressure reduction mode continues until the first variable Tp is reduced to zero.

In such a manner, the cylinder pressures $P_{FL}$ and $P_{FR}$ in the wheel cylinders 1FL and 1FR can be adjusted to the target cylinder pressures $P^*_{FL}$ and $P^*_{FR}$, respectively.

Figure 7:
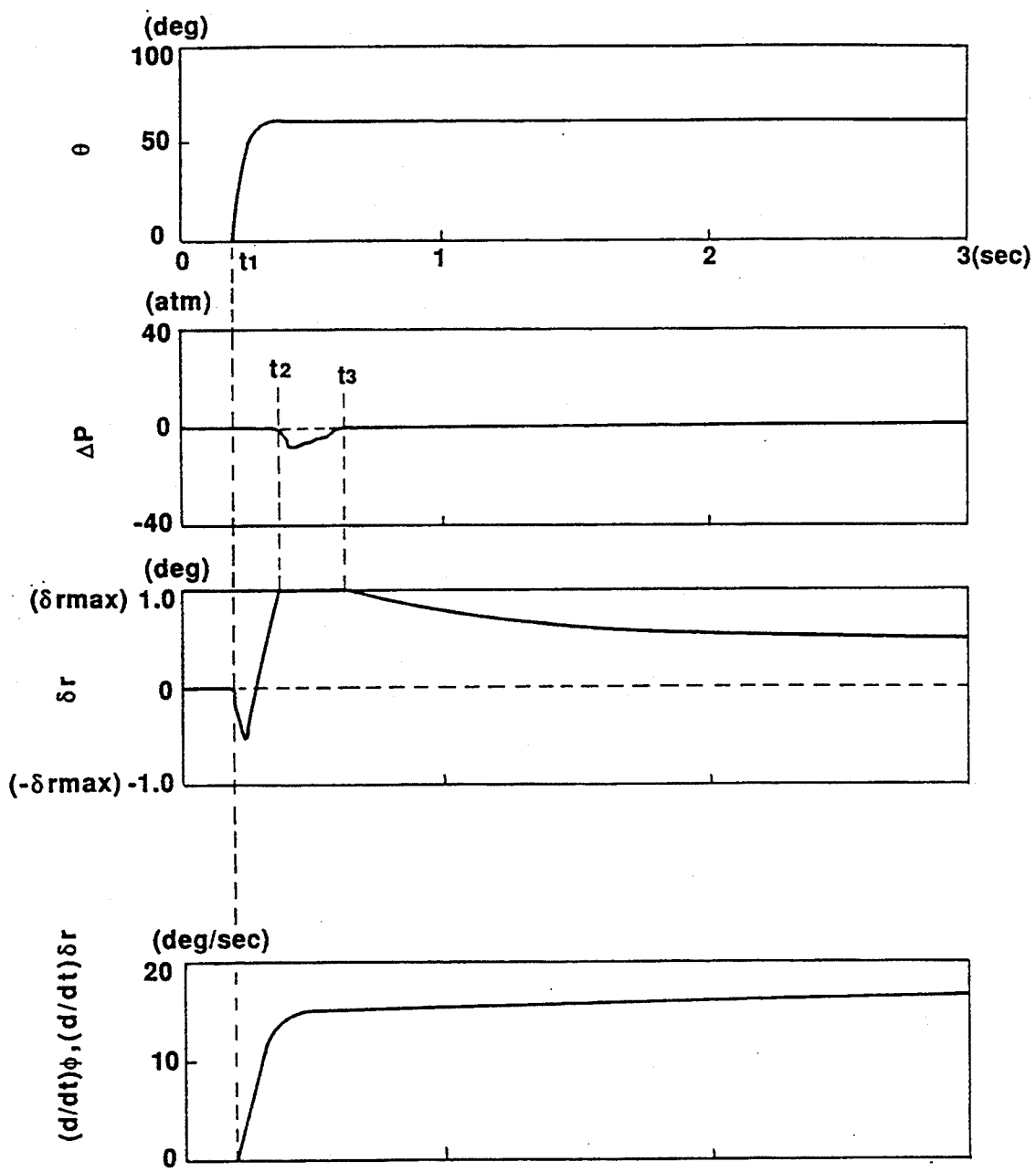
FIG. 7 is a time chart used in explaining the operation of the vehicle dynamic characteristic control apparatus of the invention.

The rear-wheel steering control and the braking force difference control are utilized to control the yaw rate $(d/dt)\Phi$ to its target value $(d/dt)\Phi_r$ when the steering angle $\theta$ changes in a stepped fashion, as shown in FIG. 7. The braking force difference control is made only during the interval between the time t2 to the time t3 where the target yaw rate cannot be achieved by the rear-wheel steering control only. FIG. 8 relates to the conventional vehicle dynamic characteristic control apparatus where the braking force difference control is made continuously after the time t1 at which the rear-wheel steering control starts.

Although the invention has been described in connection with rear-wheel steering control, it is to be noted, of course, that front- and/or rear- wheel steering control may be utilized to control the yaw rate. In addition, the vehicle dynamic characteristic control apparatus of the invention may be arranged to provide a difference between the braking force applied to the left-rear wheel and the braking force applied to the right-rear wheel to control the vehicle lateral speed. Although the vehicle speed sensor is used to sense the vehicle longitudinal speed, it is to be noted that the vehicle longitudinal speed may be calculated based upon the vehicle wheel speeds and the vehicle longitudinal acceleration.

Although the absolute value $|\delta_r(n)|$ of the target rear-wheel steering angle $\delta_r(n)$ is compared with a maximum possible value $\delta_{rmax}$ to determine a demand for the braking force difference control, it is to be noted that the absolute value $|\delta_r(n)|$ may be compared with an appropriate predetermined value less than the maximum possible value $\delta_{rmax}$. In addition, the demand for the braking force difference control may be determined by a comparison of the absolute value of the actual rear-wheel steering angle $\delta_r$ sensed by the rear-wheel steering angle sensor 31 with a predetermined value. Furthermore, the control unit may be arranged to correct the predetermined value according to the change of the steering control system including rear-wheel steering control cylinder 22 with time.

What is claimed is:

1. A vehicle dynamic characteristic control apparatus for use with an automotive vehicle supported on a pair of front wheels and a pair of rear wheels, the apparatus comprising:
   a first control unit for controlling a steering angle of one of the wheel pairs;
   a second control unit for controlling braking forces to be applied to left and right wheels of at least one of the wheel pairs;
   sensor means sensitive to opera ting conditions of the vehicle for providing sensor signals indicative of sensed vehicle operating conditions; and
   a third control unit coupled to the sensor means for calculating a target value for a dynamic parameter related to a motion of the vehicle based upon the sensed vehicle operating conditions, the third control unit including first means for calculating a target value for the steering angle of the one wheel pair, second means for controlling the steering angle of the one wheel pair to the target steering angle value so as to bring the dynamic parameter to the target dynamic parameter value, third means for calculating an absolute value of the calculated target steering angle value, fourth means for comparing the calculated absolute value with a predetermined value, and fifth means for controlling the second control unit to provide a difference between the braking forces applied to the left and right wheels of the one wheel pair so as to bring the dynamic parameter to the target dynamic parameter value only when the calculated absolute value exceeds the predetermined value.

2. The vehicle dynamic characteristic control apparatus as claimed in claim 1, wherein the dynamic parameter is a vehicle yaw rate.

3. The vehicle dynamic characteristic control apparatus as claimed in claim 1, wherein the sensor means includes a first sensor sensitive to a steering wheel position for providing a signal indicative of a sensed vehicle steering condition, a second sensor sensitive to a vehicle longitudinal speed for producing a signal indicative of a sensed vehicle longitudinal speed, and a third sensor sensitive to a vehicle longitudinal acceleration for producing a signal indicative of a sensed vehicle longitudinal acceleration.

4. The vehicle dynamic characteristic control apparatus as claimed in claim 3, wherein the third control unit includes means for calculating the target dynamic parameter value from a vehicle model specifying the target dynamic parameter value as a function of the sensed vehicle steering condition, the sensed vehicle longitudinal speed and the sensed vehicle longitudinal acceleration, the vehicle model being derived from an equation of yaw motion of the vehicle and an equation of lateral motion of the vehicle.

5. The vehicle dynamic characteristic control apparatus as claimed in claim i, wherein the fifth means includes means for calculating a target braking force difference value, and means for controlling the second control unit to bring the braking force difference to the calculated target braking force difference value.

6. A vehicle dynamic characteristic control apparatus for use with an automotive vehicle supported on a pair of front wheels and a pair of rear wheels, the apparatus comprising:
   a first control unit for controlling a steering angle of one of the wheel pairs;
   a second control unit for controlling braking forces to be applied to left and right wheels of at least one of the wheel pairs;
   sensor means sensitive to operating conditions of the vehicle for providing sensor signals indicative of sensed vehicle operating conditions; and
   a third control unit coupled to the sensor means for calculating a target value for a dynamic parameter related to a motion of the vehicle based upon the sensed vehicle operating conditions, the third control unit including first means for sensing an actual value for the steering angle of the one wheel pair, second means for controlling the steering angle of the one wheel pair to the target steering angle value so as to bring the dynamic parameter to the target dynamic parameter value, third means for calculating an absolute value of the sensed actual steering angle value, fourth means for comparing the calculated absolute value with a predetermined value, and fifth means for controlling the second control unit to provide a difference between the braking forces applied to the left and right wheels of the one wheel pair so as to bring the dynamic parameter to the target dynamic parameter value only when the calculated absolute value exceeds the predetermined value.

7. The vehicle dynamic characteristic control apparatus as claimed in claim 6, wherein the dynamic parameter is a vehicle yaw rate.

8. The vehicle dynamic characteristic control apparatus as claimed in claim 6, wherein the sensor means includes a first sensor sensitive to a steering wheel position for providing a signal indicative of a sensed vehicle steering condition, a second sensor sensitive to a vehicle longitudinal speed for producing a signal indicative of a sensed vehicle longitudinal speed, and a third sensor sensitive to a vehicle longitudinal acceleration for producing a signal indicative of a sensed vehicle longitudinal acceleration.

9. The vehicle dynamic characteristic control apparatus as claimed in claim 8, wherein the third control unit includes means for calculating the target dynamic parameter value from a vehicle model specifying the target dynamic parameter value as a function of the sensed vehicle steering condition, the sensed vehicle longitudinal speed and the sensed vehicle longitudinal acceleration, the vehicle model being derived from an equation of yaw motion of the vehicle and an equation of lateral motion of the vehicle.

10. The vehicle dynamic characteristic control apparatus as claimed in claim 6, wherein the fifth means includes means for calculating a target braking force difference value, and means for controlling the second control unit to bring the braking force difference to the calculated target braking force difference value.

11. A vehicle dynamic characteristic control apparatus for use with an automotive vehicle supported on a pair of front wheels and a pair of rear wheels, the apparatus comprising:
   a first control unit for controlling a steering angle of one of the wheel pairs;
   a second control unit for controlling braking forces to be applied to left and right wheels of at least one of the wheel pairs;
   sensor means sensitive to operating conditions of the vehicle for providing sensor signals indicative of sensed vehicle operating conditions; and
   a third control unit coupled to the sensor means for calculating a target value for a dynamic parameter related to a motion of the vehicle based upon the sensed vehicle operating conditions, the third control unit including first means for calculating a target value for the steering angle of the one wheel pair, second means for controlling the steering angle of the one wheel pair to the target steering angle value so as to bring the dynamic parameter to the target dynamic parameter value, third means for calculating an absolute value of the calculated target steering angle value, fourth means for comparing the calculated absolute value with a predetermined value, and fifth means for controlling the second control unit to provide a difference between the braking forces applied to the left and right wheels of the one wheel pair so as to bring the dynamic parameter to the target dynamic parameter value only when the calculated absolute value is not less than the predetermined value.

* * * * *